March 17, 1925.  1,530,235
H. E. S. CHAYES
DENTAL MODEL
Filed July 27, 1921   2 Sheets-Sheet 1
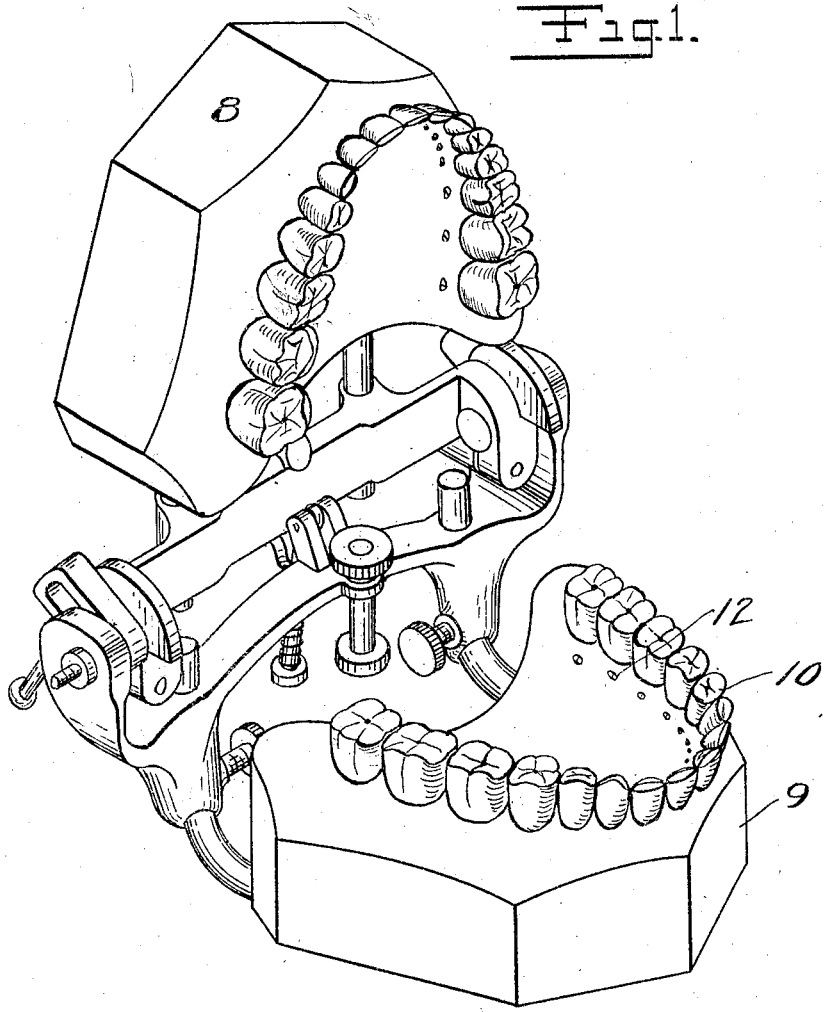
Fig.1.
Fig.2.
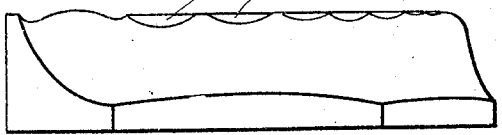

March 17, 1925. 1,530,235
H. E. S. CHAYES
DENTAL MODEL
Filed July 27, 1921 2 Sheets-Sheet 2
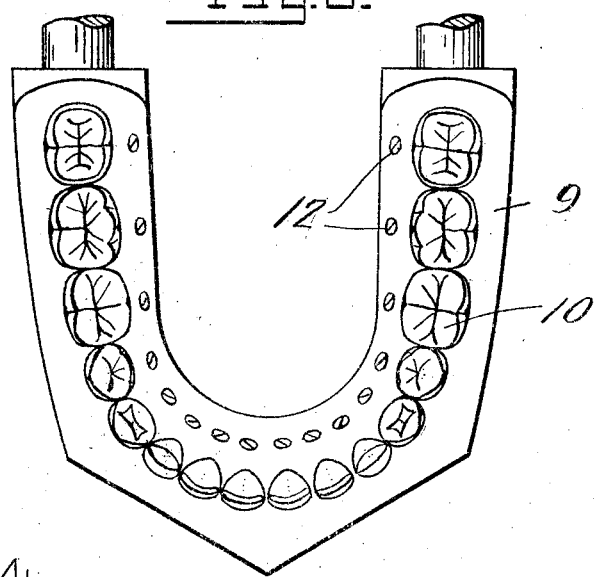
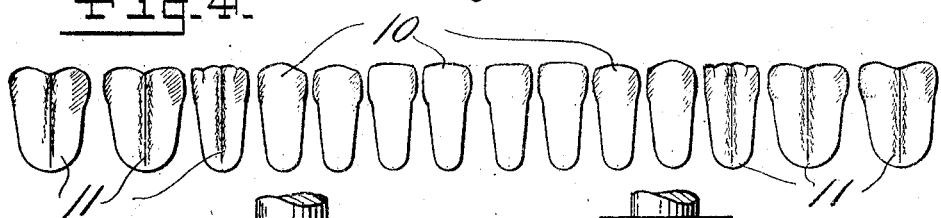
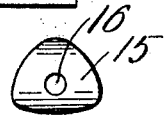
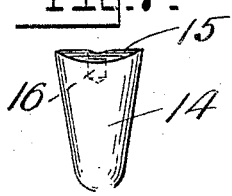
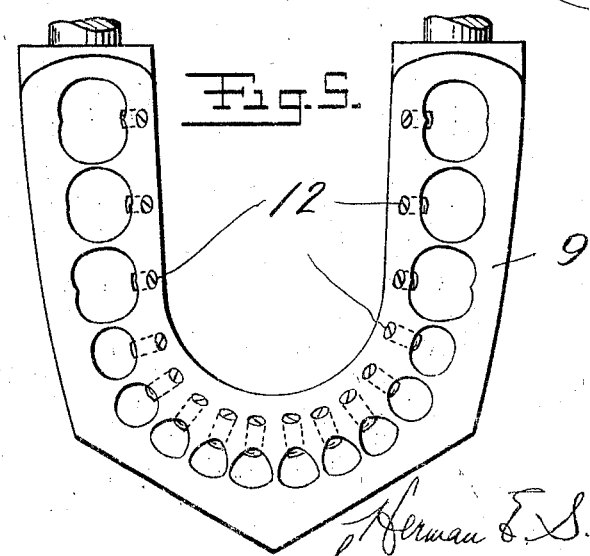

Patented Mar. 17, 1925.

1,530,235

UNITED STATES PATENT OFFICE.

HERMAN E. S. CHAYES, OF NEW YORK, N. Y., ASSIGNOR TO CHAYES SYSTEM LABORATORIES INC., OF NEW YORK, N. Y., A CORPORATION OF DELAWARE.

DENTAL MODEL.

Application filed July 27, 1921. Serial No. 487,839.

*To all whom it may concern:*

Be it known that I, HERMAN E. S. CHAYES, a citizen of the United States, residing at New York, in the county of New York and State of New York, have invented certain new and useful Improvements in Dental Models, of which the following is a specification.

This invention relates to models intended particularly for use in teaching dentistry. An object of the invention is to provide a model of this kind including supporting members representing the upper and lower jaw, suitably articulated and each provided with sockets corresponding in number, position, size and shape to those occurring in the natural jaw. Furthermore, the invention provides for each socket a piece simulating in shape and size one of the natural teeth; and there are also provided for the sockets, plugs which may be inserted, the outer ends of these plugs when in position being flush with the gum surface of the jaw member. In connection with these tooth and plug members, means will be provided for retaining them in position in the jaw members.

A further object of the invention is to make the tooth members of the model of a material which may be drilled or cut in substantially the same way as natural tooth structure; and in a contemplated form of embodiment the tooth members will be substantially transparent, so that if the model is used, for instance, for demonstrating inlay or filling technique, the procedure incident to cavity preparation may be carried on with the maximum visibility.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown merely a preferred form of embodiment of invention:

Figure 1 is a perspective view of a model embodying my invention, showing the tooth members in position in the jaws;

Figure 2 is a side elevation of the lower jaw member detached and with tooth members and plugs indicated;

Figure 3 is a plan view of the lower jaw member detached and showing the tooth members in position and the screws for holding them in position;

Figure 4 is a collective view of the tooth members which are to be held in the jaw member of Figure 3;

Figure 5 is a view similar to Figure 4, but showing the tooth members removed and replaced by plug members;

Figure 6 is a top plan view of one of the plug members; and

Figure 7 is a side elevation of the same.

Referring to the numerals on the drawings, there is shown in Figure 1 a familiar form of articulator including an upper jaw member 8 and a lower jaw member 9, which constitute the supporting members for the tooth and plug members hereinafter referred to. These upper and lower jaw members are pivotally secured together and have an adjustable relation for variations in bite, etc. Inasmuch as the subject-matter which constitutes my invention is substantially the same whether applied to the upper jaw member or the lower jaw member, I will confine my description to the lower jaw member. Accordingly the member 9 is provided with a number of sockets, of position, size, shape and relation corresponding with the tooth sockets of a natural jaw; and adapted for insertion into these sockets is a plurality of tooth members 10 (Figure 4) each having a shank 11 conforming to a particular socket and so that it will be impossible to misposition the tooth members when inserting them into the jaw part of the model. When the tooth members are seated in their respective sockets they are held in position as by means of set screws 12 extending from the surface of the jaw member and engaging shanks 11. As indicated above, these tooth members will preferably be made of some composition which can be drilled or cut as nearly as possible like natural tooth structure, so that the dental student or instructor may work upon one of these models, in teaching inlay or filling practice, with substantially the same effectiveness as though natural teeth were being operated upon. Furthermore, I contemplate that the tooth members may be made of a material which, in addition to the qualities before mentioned, shall have the characteristic of substantial transparency, for reasons stated above.

In teaching bridgework technique it will be desirable, in demonstrating the solution of various problems, to make the model simulate the condition in which there is an edentate space or edentate spaces. To this end I provide the plugs shown in Figures 5, 6 and 7. These plugs, indicated by the reference character 14, also have shanks corresponding to the respective sockets, so that there is a plug for each socket in the same way that there is a tooth member appropriated to each socket. To provide the conditions of a typical bridgework case it is only necessary to remove one or more of the tooth members, replacing it or them with the corresponding plugs 14, these plugs of course fitting the socket so that their outer surfaces 15 are flush with the general gum surface of the jaw member, in order that the relations of saddles, plates, etc., to the gum may be demonstrated and appreciated. These plugs are held in position in the same way as are the tooth members, for instance, by means of screws 12, Figure 5; and in order that the plugs may be readily withdrawn from their sockets, each may be provided in its outer surface with an aperture 16 into which a suitable tool may be inserted for lifting them out. The plugs may be of any suitable material, since they will not be cut or drilled.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. A model of the kind described comprising a jaw member provided with a series of tooth sockets, each socket simulating in shape and size a particular tooth socket of a natural jaw and a series of tooth members each having a particularly formed shank shaped to fit within one of said sockets and an exterior portion simulating the exposed portion of a natural tooth, said tooth member being made of a material which may be cut in substantially the same way as natural tooth structure.

2. A model of the kind described comprising a jaw member provided with a series of tooth sockets, each socket simulating in shape and size a particular tooth socket of a natural jaw and a series of tooth members each having a shank shaped in cross section to snugly fit within one of the particularly formed sockets and an exterior portion simulating the exposed portion of a natural tooth, said tooth member being made of a material which may be cut in substantially the same way as natural tooth structure, and being substantially transparent.

3. A model of the kind described comprising a jaw member provided with a series of individual tooth sockets simulating in shape and size the tooth sockets of a natural jaw and a series of individual tooth members each having a shank shaped to snugly fit within one of said sockets and an exterior portion simulating the exposed portion of a natural tooth, said tooth member being made of a material which may be cut in substantially the same way as natural tooth structure, and a series of plug members also shaped to snugly fit within one of said sockets and having an exterior surface flush with the adjacent surface of the jaw member, and means extending through the side of the jaw member for detachably securing said tooth members or plugs in position in said socket.

In testimony whereof I affix my signature.

HERMAN E. S. CHAYES.